Feb. 23, 1932.  J. KUBLER  1,846,033
RECTIFIER
Filed Feb. 14, 1929
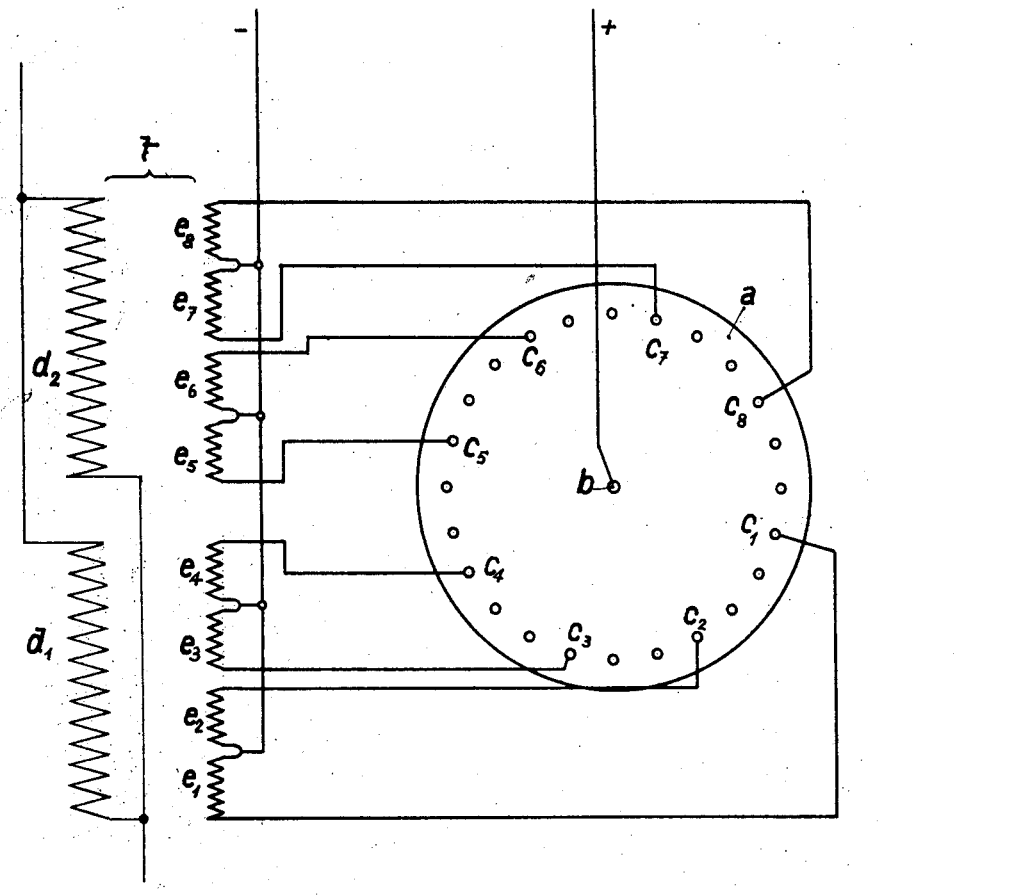
Inventor
Johannes Kubler
By Alfred H. Dyson
Attorney Patented Feb. 23, 1932

1,846,033

UNITED STATES PATENT OFFICE

JOHANNES KUBLER, OF BADEN, SWITZERLAND

RECTIFIER

Application filed February 14, 1929, Serial No. 339,817, and in Germany February 13, 1928.

This invention is an improvement in or a modification of the invention claimed in application for United States Letters Patent, Serial No. 305,111 filed September 10, 1928.

The main patent relates to a system of connections for feeding two or more anodes working in parallel in one or more rectifiers or equivalent arrangements from the separate secondary windings of a common transformer, in which the primary winding of the transformer is subdivided into a number of parts equal to the number of secondary windings, which parts are connected in parallel to one another and are arranged beside one another, each secondary winding being co-ordinated to one of the said parts by being arranged immediately opposite to it.

Due to the subdivision of the primary winding in accordance with the subdivision of the secondary winding electrodynamic forces are obtained, which result in only slight mechanical stressing of the copper. Such an extensive subdivision of the primary winding is, however, a disadvantage as regards the cost of manufacture which is the greater the further the subdivision is carried.

According to the invention, this disadvantage is overcome by the use of secondary windings which are co-ordinated to the parallel-connected anodes, arranged in groups opposite the parallel-connected, spatially separated parts of the subdivided primary winding.

The drawing illustrates a constructional example of the invention. For the sake of clearness only two phases of a six-phase rectifier are shown. $a$ is the rectifier with $b$ the cathode and $c$ the anodes. The supply transformer $t$ has its primary winding divided into two sections $d_1$ and $d_2$ which are connected in parallel but spatially separated from each other. The parallel operating anodes of one group which are supplied by the two phases of the secondary windings are divided into sections $e_1$ to $e_8$ which are arranged in two groups in interleaved relation so that the sections $e_1$ and $e_3$ of the same phase are arranged in one group and sections $e_2$ and $e_4$ of a phase displaced 180° from the above mentioned phase are arranged in the same group. The arrangement of the sections in the second group is similar to that above given so that sections $e_1$, $e_3$, $e_5$, $e_7$, of the same phase and sections $e_2$, $e_4$, $e_6$, $e_8$ of the other phase are distributed throughout both groups. Each four secondary windings comprise a group which corresponds to one division $d_1$, $d_2$ of the primary winding. The secondary windings may be arranged to form adjacent groups as in the drawing, or may be intermixed within the groups. Each of the secondary winding sections $e_1$ to $e_8$ supply one of the anodes $c_1$ to $c_8$. The anodes supplied by the same phase operate in parallel as is usual.

Through the reduction in the number of subdivisions of the primary winding in accordance with the invention, the reduction in the cost of manufacture desired is realized. The reduction in the number of subdivisions can be carried as far as the permissible tensile stressing of the copper will allow.

To reduce the influence of one winding part on another to a minimum, the winding parts are arranged at such distance apart that the transformer is subdivided as it were into a plurality of separate transformers having a common core.

What I claim is:

1. In a transformer for a rectifier system in which a plurality of anodes operate in parallel, said transformer comprising a primary winding subdivided into a plurality of parallel-connected sections, and a secondary winding subdivided into sections, each of the said secondary winding sections being connected to a different one of the said anodes and arranged opposite a part only of one of the said primary winding sections.

2. In a transformer for a rectifier in which a plurality of anodes operate in parallel, said transformer comprising a primary winding subdivided into a plurality of parallel-connected sections, and a secondary winding subdivided into sections, each of the said secondary winding sections being connected to a different one of the said anodes and arranged opposite a part only of one of the said primary winding sections in such manner as to effect predetermined division of the current to the anodes.

3. In an electric current rectifier system comprising a rectifier having a plurality of anodes adapted to be operated in parallel, a supply transformer comprising a primary winding subdivided into a plurality of parallel-connected and spatially separated sections and a plurality of secondary winding sections, each of said secondary winding sections being connected to a separate one of the said anodes and arranged opposite a part only of one of the said primary winding sections in such manner as to effect delivery of substantially equal current to each of the said anodes when operating in parallel.

4. In an electric current rectifier system comprising a rectifier having a plurality of anodes adapted to be operated in parallel, a supply transformer comprising a primary winding subdivided into a plurality of parallel-connected and spatially separated sections and a plurality of secondary winding sections, the said secondary winding sections being divided into groups equal in number to and arranged opposite the respective said spatially separated primary winding sections, and each of the said secondary sections being connected to one of the said anodes and closely coupled with a part only of its associated primary winding section in such manner as to cause delivery of substantially equal current to each of the said anodes when operating in parallel.

In testimony whereof I have hereunto subscribed my name this 28th day of January A. D. 1929.

JOHANNES KUBLER.